May 6, 1969

A. B. WILSON, JR 3,442,136

AUTOMATIC FLUID SAMPLER

Filed Aug. 10, 1966

INVENTOR.
AUGUSTUS B. WILSON
By Gordon H. Olson
ATTORNEY.

United States Patent Office  3,442,136
Patented May 6, 1969

3,442,136
AUTOMATIC FLUID SAMPLER
Augustus B. Wilson, Jr., Tyler, Tex., assignor to International Telephone and Telegraph Corporation, New York, N.Y., a corporation of Maryland
Filed Aug. 10, 1966, Ser. No. 571,650
Int. Cl. G01n 1/10
U.S. Cl. 73—422                                1 Claim

ABSTRACT OF THE DISCLOSURE

The invention includes a fluid sampler in which means defining a passage into sampler are provided for introducing solvents under a pressure greater than the line pressure in an oil line and dissolving accumulated paraffin in the sampler.

---

The present invention relates to automatic fluid sampling equipment and particularly to such equipment when used for sampling oil from a high pressure oil line.

In many fluid flow systems, such as in an oil well pumping unit, it is desirable to sample and test periodically the characteristics of the fluid passing through the system. Various sampling devices have been developed and installed in fluid lines to automatically extract predetermined quantities of the fluid on a scheduled basis. One such sampler is disclosed in U.S. Patent No. 3,062,055 to Lloyd W. Bills.

Typically, such sampling devices includes relatively small passages, valves and ports through which the fluid sample such as oil must pass. One problem which arises in the taking of such samples due to the small and restricted passages within the device is that paraffin compounds within the oil frequently cause the sampler to become clogged and inoperative. While all paraffin-base crude oil naturally contains paraffin to some degree, the other properties of the crude oil and other physical conditions determine the extent to which paraffin accumulation becomes a problem. Where the conditions for such accumulation exist even large flow lines will plug against a very high pressure. Although various approaches have been used for eliminating this problem, no completely satisfactory arrangements have been developed for certain types of samplers. As a result, it has been necessary in many instances to dissassemble the sampling device from the oil line and mechanically clean the device by taking it apart. The cleaning operation by itself is naturally a time consuming, expensive process, but more importantly, associated expensive equipment may also be temporarily unused.

In view of the foregoing, it is the primary object of this invention to provide an improved means for preventing the clogging of fluid sampling devices due to paraffin or other compounds which may exist in the fluid being sampled.

It is a further object of this invention to provide a simple, direct low-cost means for eliminating paraffin buildup in oil sampling devices.

The oil sampling device of the invention includes a probe extending into an oil line and connected at one interval through valve means as for example a three-way valve, to a chamber for accumulating a sample of oil with the chamber being further connected at a later interval through the same valve means to a sample container. Suitable means are provided for controlling the opening and closing of the valve.

In order to prevent clogging of the valves, a passage is formed in the side wall of the chamber extending from the exterior to the interior of the chamber for introducing a solvent capable of dissolving any paraffin which might accumulate in the device. A one way valve is positioned in said passage for permitting the solvent to flow into the device through the passage but preventing the solvent and the oil from flowing out of the device through said passage. The solvent should be placed under adequate pressure to overcome the oil line pressure so that the solvent will flow through the valve means leading to the accumulator chamber, as well as through the valve means out of the accumulator.

Further features, objects and attendant advantages will become apparent with reference to the following drawings in which.

Figure 1:
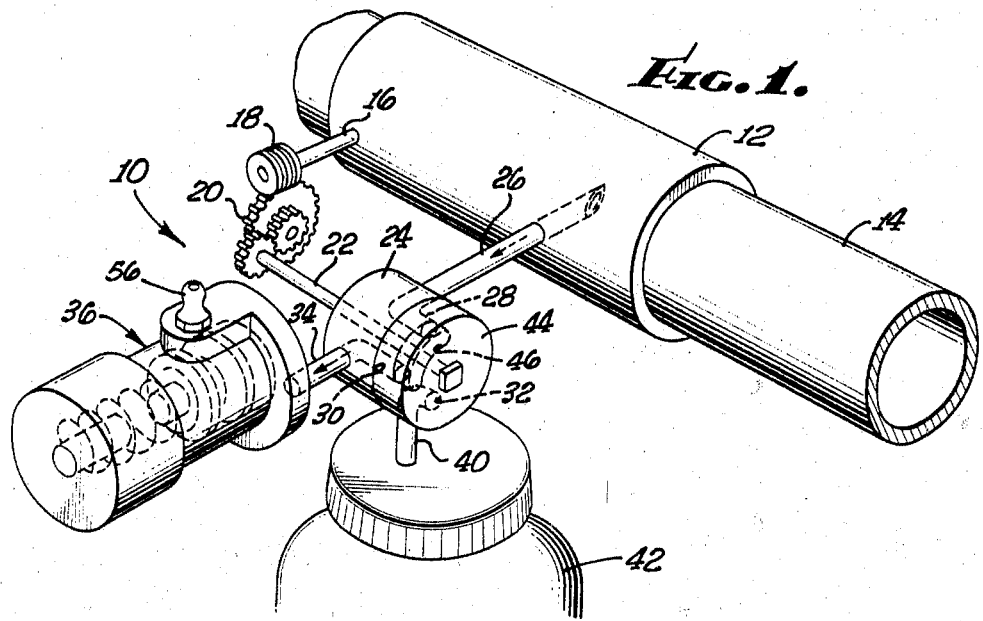
FIG. 1 is a partial schematic illustration of the oil sampler of the invention with the components shown in the oil intake phase of the cycle.

Since the present invention relates primarily to the means for solving the paraffin accumulation problem and does not require a detailed understanding of a detailed explanation of the overall constructional features of the sampler apparatus the drawings have been illustrated in a schematic form. If further details are desired, however, reference may be made to the above mentioned Bills patent.

The sampler device generally indicated at 10 is mounted on a fluid flow meter generally indicated by the numeral 12 which in turn is mounted in an oil pipe line generally indicated by the number 14. If operation and constructional details of such a flow meter are desired, reference may be had to U.S. Patent 2,738,775. As the sampler is mounted onto the flow meter 12, two operational connections with the meter are also made. One connection consists of a drive shaft 16 within the sampler connected in driven relation with a rotating shaft in the meter (not shown). A worm gear 18 is carried on the end of shaft 16 to drive a gear train 20 which reduces the rotational speed and drives an operational shaft 22 of the sampler. The shaft 22 is rotatably supported by a fixed valve seat member 24 having a generally cylindrical shape and including several different passages therein. Drive shaft 16 and the gear train connected therewith may be identical to those shown in U.S. Patent No. 3,063,055, if desired.

The other connection to the flow meter 12 is a sampler probe 26 which is a tubular element also extending into valve seat 24. The valve seat 24 has formed therein three generally right angle passages 28, 30 and 32 spaced around the valve seat and each including a component extending outwardly to the circumferential face of the valve seat and a component extending axially to one end face of the valve seat. Sampler probe 26 is connected to valve inlet passage 28; accumulator passage 30 is connected by a conduit 34 to a cylindrically shaped accumulator 36 defining a chamber 38 for receiving oil samples; and outlet passage 32 is connected to a tube 40 which extends downwardly into a larger container 42 for collecting the oil samples.

To selectively interconnect the various passages in the valve seat, there is provided a rotatable valve disc 44 mounted on the end of shaft 22. Within the valve disc 44, there is formed an arcuate groove or recess 46 which has an arcuate dimension adequate to span the gap between the axial components of passages 28 and 30 and passages 30 and 32. Thus, as the shaft 22 rotates it causes rotation of valve disc 44 and sequential interconnection of passages 28 and 32 with passage 30 in valve seat 24.

The accumulator 36 in its actual physical form is connected directly to the sampler body so that its inner end is essentially closed except for the conduit 34 leading into the chamber 38. The other end of chamber 38 is defined by an accumulator piston 48, which is spring loaded by an accumulator spring 50. The spring 50 urges the accumulator piston inwardly to decrease the size of the chamber 38 thus tending to urge any fluid out of the chamber 38.

Figure 2:
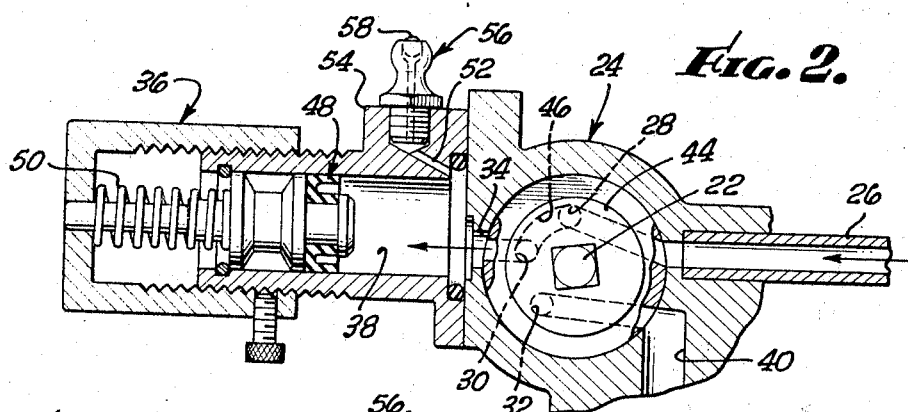
FIG. 2 is an enlarged cross section of a portion of FIG. 1.

In operation, refer first to FIG. 1 wherein the components are shown in the oil intake phase. In this position, valve disc 44 interconnects inlet passage 28 with accumulator passage 30 leading to the accumulator chamber 38. Accordingly, oil entering the open end of the sampler probe is forced under line pressure through the passages in the valve assembly into the accumulator chamber 38. The oil pressure which is greater than the pressure of spring 50 causes the accumulator piston 48 to be forced outwardly to the position shown in FIG. 2.

Figure 3:
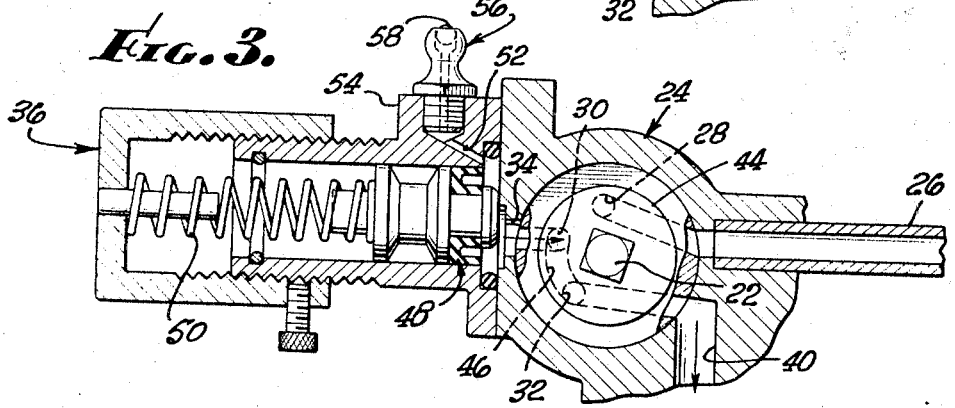
FIG. 3 is a view of the structure of FIG. 2 with the components shown in the oil discharge phase of the cycle.

As the shaft 22 rotates, valve disc 44 is also rotated so that its recess 46 interrupts the intercommunication between inlet passage 28 and the accumulator passage 30 to interconnect accumulator passage 30 with the discharge passage 32 connected to the discharge tube 40 leading into the sample container 42, as shown in FIG. 3. Since the sample container is at atmospheric pressure, accumulator spring 50 urges accumulator piston 48 inwardly to force the oil in the accumulator chamber into the sample container 42.

As the sampler shaft 22 continues to rotate, this cycle is repeated. Inasmuch as the flow meter output shaft is a function of the oil flowing through the pipe line 14, it will be understood that sampler shaft 22 also rotates as a function of the oil flow and consequently the samples taken from the oil lines are proportional to the oil flow. In this way, accurate samples of oil can be taken over a period of time to represent a true sample of the oil passing through the pipe line. The accumulator 36 is generally made adjustable in size so that the size of the sample desired may be easily adjusted.

While the foregoing described device provides automatic accurate oil sampling, as mentioned above, one recurring problem has been the clogging of the sampler due to paraffin compounds in the crude oil. Upon analysis, it has been learned that the apparent points of maximum paraffin accumulation in oil lines and equipment are: (a) cold spots or points of low temperature, (b) areas of high turbulences, (c) void areas, or (d) points of high pressure drop. All four of the preceding conditions may occur simultaneously assuming a restriction causing a high pressure drop with a resulting temperature drop and maximum turbulence occuring in a void on the downstream side of the restriction. This is precisely what occurs in the probe and the internal porting of the above-described sampler.

Various approaches have been tried to solve this problem, however, none have proven completely satisfactory. Suitable solvents or inhibitors have been injected into the main pipe line in an attempt to prevent paraffin accumulation within the small passages of the sampler itself, however, the solvent concentration received by the samples has not been adequate to eliminate the accumulation. Various polymers have been applied to the surfaces expected to accept paraffin accumulation as another approach, but this has not worked. Also, heat has been applied to the liquid media or to the sampler equipment in an attempt to prevent or remove paraffin buildup. Finally, mechanical scraping devices have been employed.

In addition to eliminating or preventing paraffin buildup, the means employed must be less expensive than the cost of disassembling the equipment to manually clean it. Also, the means employed should preferably be such that existing equipment in the field can be modified with a minimum of inconvenience to the user.

In accordance with the invention, the paraffin accumulation problem has been solved by injecting a concentrated paraffin solvent directly into the sampling device at the proper location. Since portions of the sampling device such as the sampler probe and the discharge tube leading to the sampler container are not in direct communication with each other, it has been found necessary to inject the solvent as a point which, at sometime during the operational cycle of the sampler is in communication with all portions thereof. Also, the injection point must be readily accessible and easily adapted to the equipment as mentioned above. With these factors in mind, a passage 52, best seen in FIG. 3, is formed in the side wall of the accumulator cylinder leading directly into the accumulator chamber adjacent the end of the cylinder adjoining the remainder of the sampler body. A boss 54 is formed on the outer surface of the cylinder which carries an element 56 having its outer end adapted to receive a suitable tool in the nature of a grease gun, for injecting the solvent into the chamber. A one-way valve mechanism schematically indicated at 58 permits flow into the cylinder but prevents flow outwardly therefrom.

With this simple approach, the solvent may be injected directly into the cylinder during the cyclic operation of the sampler with the result that solvent is forced into all passages of the valve members 24 and 44. During the normal oil intake phase of the cycle, solvent is forced through passages 34, 30, 46 and 28 outwardly through the sampler probe 26. During the discharge phase, solvent is forced through passages 34, 30, 46, 32 and 40.

Thus, during the portion of the cycle where line 26 is connected through passage 46 to the cylinder 38, solvent may be injected under pressure through the one-way valve 56 at a pressure higher than the oil line. The solvent will then flow out through the passages 30, 46, 28 and probe 26 to clean out this probe. At the same time since the solvent is at a pressure higher than the oil line, it will also fill the cylinder 38 by forcing the spring 50 back, filling the cylinder with solvent. During the next portion of the cycle, neither line 28 nor 32 is connected to 30 and the solvent remains in the cylinder 38 and does not flow out either through probe 26 or passage 32 or through the one-way valve 56, which is then reversed biased. In the next portion of the cycle, passage 30 is connected through passage 46 to passage 32. Since the container 42 is at atmospheric pressure, the spring 50 will force the solvent from the cylinder 38 through the passageways 30, 46, and 32 into the container 42, cleaning out those passageways.

Naturally, it is necessary that the pressure on the solvent to be applied to the accumulator cylinder be greater than that of the oil line pressure (typically in the range of 30 to 45 p.s.i.) in order to inject solvent into the probe. It has been found, however, that it is preferable that the solvent pressure not exceed twice the oil line pressure to minimize the possibility of the valve mechanism becoming jammed.

A portion of the solvent and dislodged and dissolved paraffin is then forced into the oil line while the remainder is directed to the sample container 42. If desired, the container may be replaced during the cleaning operation by a different receptacle so that the sample is not affected thereby. The cleaning operation may be conveniently performed at a time when sample containers are being changed.

From the foregoing, it can be seen that the approach used to solve the paraffin problem is direct and inexpensive in that the solvent is added at the exact point needed. Also, the modifications required to existing equipment are minor in that it is only necessary to remove the accumulator cylinder and add the solvent inlet passage 52 and the injection element 56. Naturally, when starting from initial manufacture these features may be included in the original part. It is also possible that the boss and solvent injection element may be mounted on a separate part which would be clamped between the remaining portion of the cylinder and the sampler body. In this way, the injection element could be very easily added to existing units in the field in areas wherein paraffin accumulation is a problem due to the nature of the oil.

While only a single embodiment of the invention has been illustrated, it should be understood that various changes and modifications can be made. For example, the solvent could also be injected directly into passage 30 by placing the injection element 56 in valve member 24, since passage 30, like chamber 38, is also in direct communication with the remainder of the sampler passages during operation.

What is claimed is:

1. In a device for taking fluid samples, the combination comprising a hollow cylinder; a piston reciprocable in said cylinder; a spring to bias said piston in a direction to remove any fluid in said cylinder; a sample container; a three-way valve having a first passage from a fluid source to said cylinder and a second passage from said cylinder to said sample container; means to move said three-way valve to first, second, and third successive positions, said three-way valve in said first position opening said first passage and closing said second passage, said three-way valve in said second position closing both of said first and second passages, said three-way valve in said third position closing said first passage and opening said second passage; and a third passage connected from the interior of said cylinder to the exterior thereof; a check valve in said third passage to admit a solvent to the interior of said cylinder, said solvent being adapted to drive out fluid in said first passage and to fill said cylinder by pressure against said piston and said spring while said three-way valve is in said first position, flow of said solvent being stopped while said three-way valve is in said second position, said solvent being forced by said spring-biased piston through said second passage when said three-way valve is in said third position.

References Cited

UNITED STATES PATENTS

| | | | |
|---|---|---|---|
| 2,099,443 | 11/1937 | Kraft | 137—240 |
| 2,139,595 | 12/1938 | Lerch et al. | 166—41 |
| 2,348,642 | 5/1944 | Penick et al. | 137—240 |
| 3,062,055 | 11/1962 | Bills | 73—422 |
| 3,192,941 | 7/1965 | Tyhurst | 137—240 |
| 3,334,648 | 8/1967 | Probst | 137—240 |

LOUIS R. PRINCE, *Primary Examiner.*

D. M. YASICH, *Assistant Examiner.*

U.S. Cl. X.R.

137—240